April 21, 1959  A. BROMS  2,882,790
COPYING CAMERA IMPROVEMENTS
Filed Nov. 9, 1956  3 Sheets-Sheet 1

Allan Broms
INVENTOR.

Allan Broms
INVENTOR.

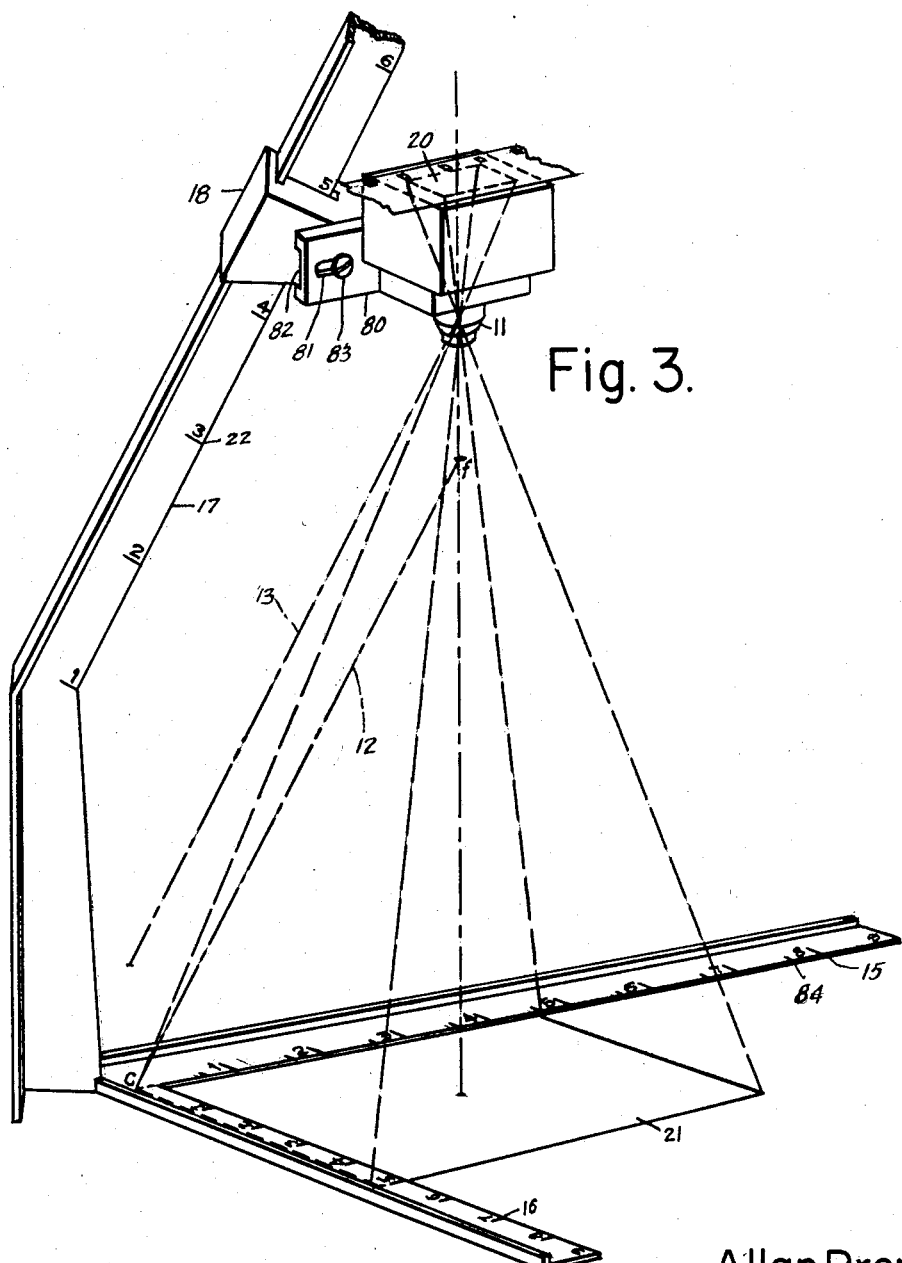

2,882,790
COPYING CAMERA IMPROVEMENTS

Allan Broms, Beechhurst, N.Y.

Application November 9, 1956, Serial No. 621,308

5 Claims. (Cl. 88—24)

This invention relates to the art of photographic copying of substantially flat originals through the lens of a camera.

The present application is a continuation-in-part of my prior application Serial No. 165,937, filed June 3, 1950, now U. S. Patent No. 2,772,599, which is a continuation-in-part of my prior application Serial No. 606,904, filed July 25, 1945, now abandoned. Also related are my U. S. Patent 2,741,945, issued April 17, 1956, and entitled, "Copying Camera Assembly," and two applications of even date herewith entitled, "Projector Improvements," and "Scanning Camera Assembly." The present application relates to improvements rendering more efficient as a camera, the inventions of said patent and of my said prior applications.

To fit either the dimensions or proportions of originals or copies thereof, and for other purposes, it is often desired to alter the dimensions of the copying camera frame aperture and to alter correspondingly other related structures thereof. Also, it is often advantageous to include in the copied area a marginal scale or reference data.

The primary object of this invention is to provide improved mechanical means whereby these ends may be accomplished simply, conveniently, positively and accurately. The apparatus shown is for purpose of illustration only, and does not define the limits of this invention.

Figure 3 is a like view showing means shifting the field area position and adapting the field length scale thereto.

Figure 1:
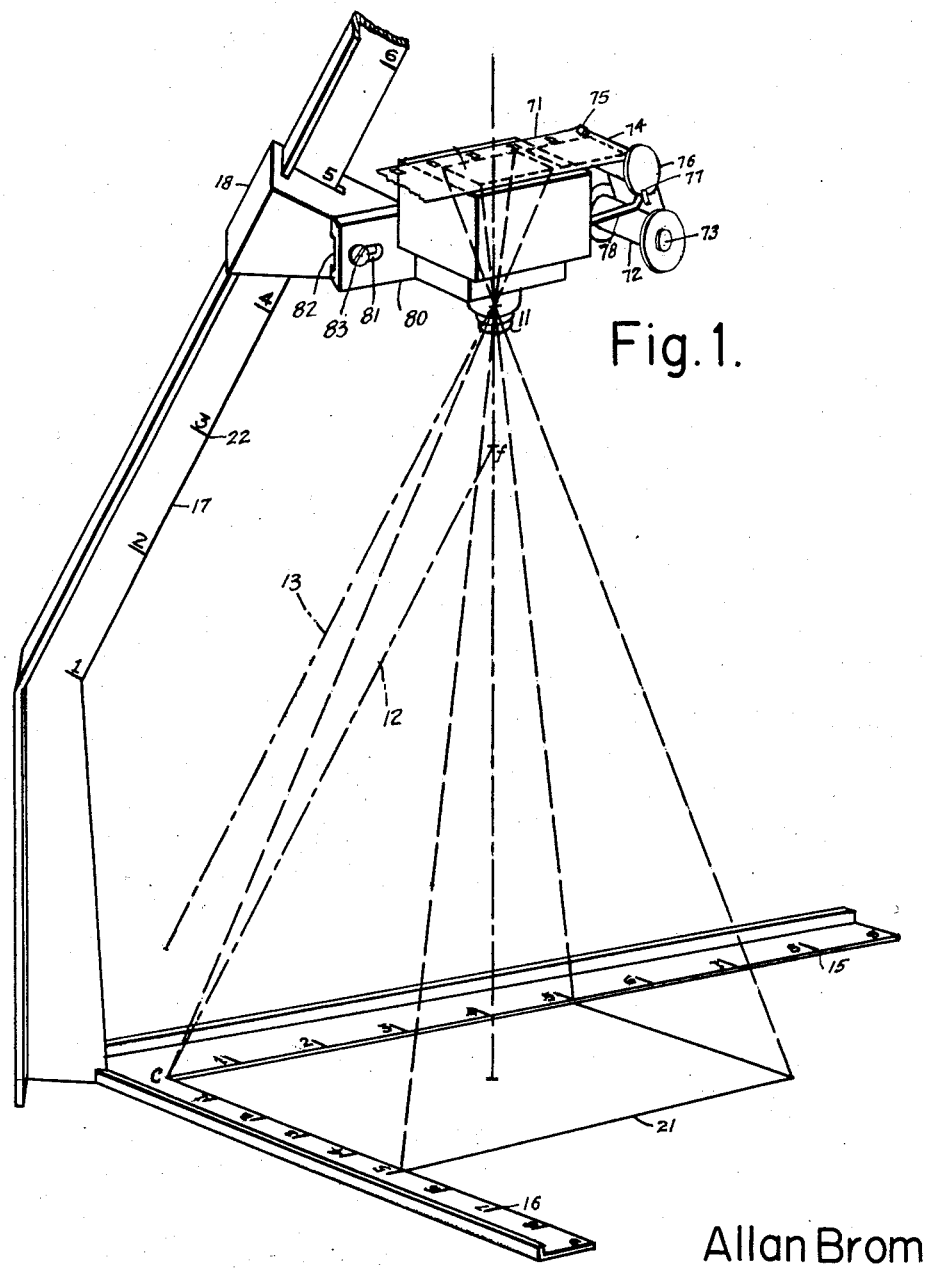
Figure 1 is a perspective view of apparatus embodying this invention.

In my Patent 2,741,945 and my application Serial No. 165,937, I secure precise fixation of two edges and one corner of the field area projection through the lens of the limiting frame aperture of a camera, at all relative conjugate focal distances of the aperture and field planes, and therefore at all ratios of copying. Furthermore I do this by merely two straight-line adjustive movements, namely: relative movement of the frame aperture coaxially of the lens; and relative movement of the lens and/or field area parallel to a straight line drawn from the principal focal point of the lens on the field side thereof to a corner of the projected field image of the frame aperture, when the planes of the aperture and field are in conjugate focus.

To facilitate comparison, the reference designations of said patent and co-pending application are similarly used in this application. More directly pertinent to the improvements of this application are the following reference designations: the lens 11; the frame aperture 20 and its conjugate projection through the lens as the field area 21; the support beam 17 and its scale 22; the sliding bracket 18; and the abutment member scales 15 and 16.

In the practice of photographic copying, it is often desired to change the size or the proportions of the frame aperture. Thus in making film-slides on 35 mm. film, the standard frame is 24 mm. x 36 mm. But for microfilming bank checks, a frame of 24 mm. x 9 mm. fits the proportions of the checks much better and saves greatly in film footage and costs.

Figure 2:
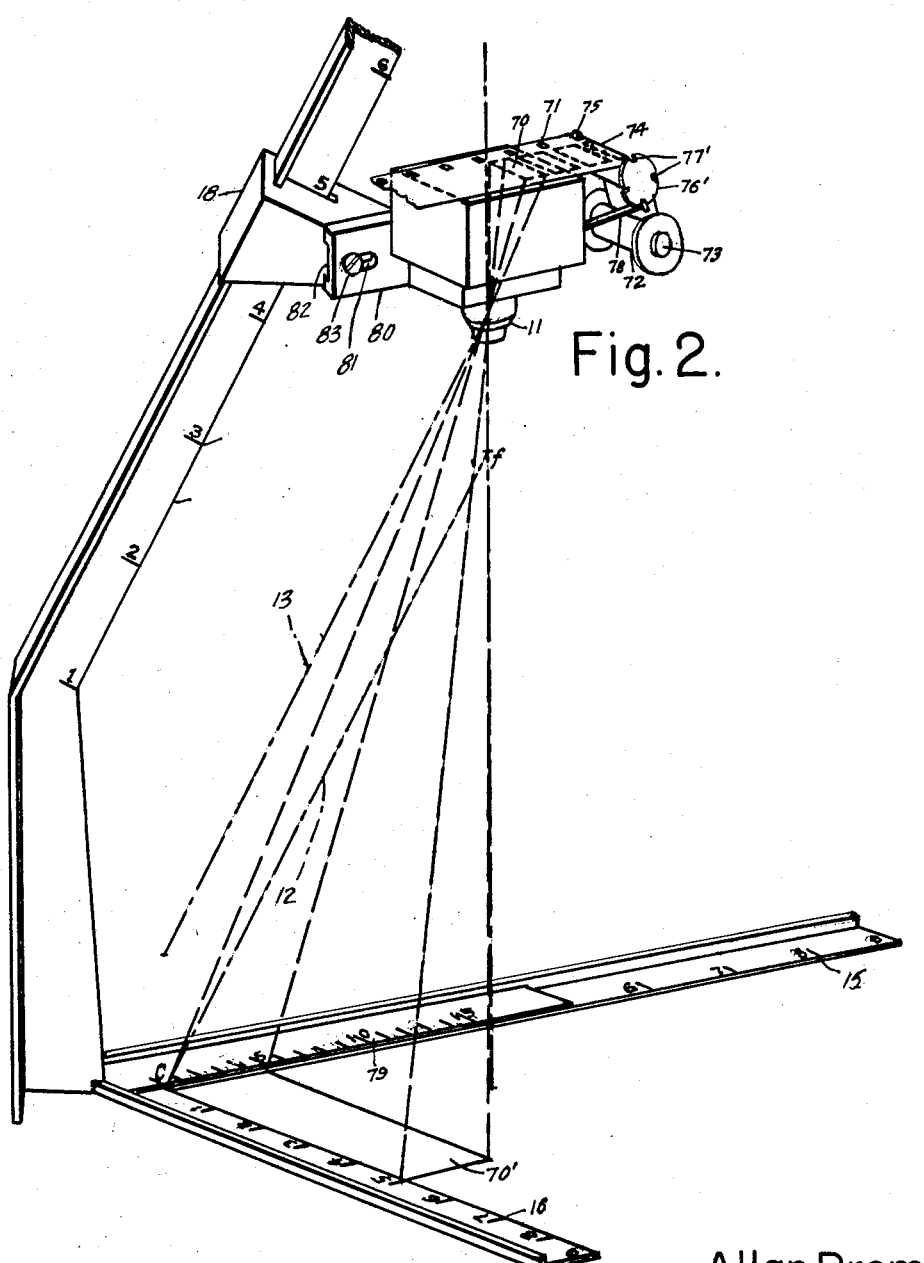
Figure 2 is a like view showing adaptations of frame aperture, film advance mechanism and field length scale.

Figure 1 shows a frame aperture 20 of film-slide proportions, representing dimensions 36 mm. in length and 24 mm. in width. In Figure 2 is shown a frame aperture 70 of the same width, but only 9 mm. longitudinally of the film. It should be noted that both these frame apertures have two adjacent edges the same, these being the two edges fixated along the abutment member edges 15 and 16, when projected from the frame aperture through the lens to any conjugate field plane.

This invention contemplates the use of any mechanical means for altering the length of the frame aperture, such as a curtain or slide drawn lengthwise thereof, or masks inserted, or interchangeable frame plates with differing apertures.

With such shortening in length of the frame aperture, it is also desirable to shorten correspondingly the unit distance by which the film is advanced from each frame to the next. Otherwise there will be wasteful blank gaps between the frames of shorter length. Thus in making film-slides, this unit distance may be 38 mm., while in copying checks it should be only 9.5 mm., in each case leaving only narrow margins between frames.

Thus in Figure 1 is shown a perforated roll film 71 and a spool 72 for film pull-up, said spool being rotated manually by a knob 73 or in any other appropriate manner. The film 71 passes over the aperture 20 and a roller 74 having sprocket teeth 75 engaging the perforations of said film 71 and having an end disc 76 with a notch 77 on its circumference. A clicker spring stop 78 engages this notch 77 once during each rotation of the roller 74 and disc 76, said roller 74 being so dimensioned as to advance the film from frame to frame by 38 mm. with each rotation.

In Figure 2 the same parts are shown, except that an interchangeable disc 76' has four notches 77' equally spaced about its circumference. With this structure, the clicker 78 will stop the disc 76' and roller 74 at each quarter rotation, and the film will advance only 9.5 mm. from frame to frame.

According to my Patent 2,741,945, the unit divisions of the abutment scales 15 and 16 are preferably respectively equal to the parallel dimensions of the frame aperture 20. Thus in Figure 1 of the accompanying drawings, the unit divisions of scale 15 are equal to the length of frame 20, namely 36 mm., while in Figure 2 an interchangeable length scale 79 is shown, its unit divisions being 9 mm., equal to the dimension of the frame 70 longitudinally of the film. In each case, the zero of the length scale is at the fixated corner C of the field area. In each case the field area limits shown by the abutment scales will show the proper ratio of copying reduction, and the proper settings of the camera bracket along the support beam scale 22 and of the focusing of the camera by its correlated scale or other focusing means.

In any case, the length of the frame aperture, the unit divisions of the field length scale, and the unit distance of film advance must be properly correlated, but any mechanical means may be used for altering them. Thus an adjustable ratchet mechanism may be used instead of the discs 76 and 76' and the clicker spring stop 78 to control the distance of film pull-up, and the unit distance of such pull-up may be any convenient portion of the full frame pull-up distance. Furthermore, while the altering is here shown as only lengthwise of the film frame, similar correlated alterations transverse of the film frame may also be employed.

As shown in Figure 1, the abutment member scales 15 and 16 lie just outside the edges of the field area being copied, and therefore do not appear projected within the frame aperture nor on the copy as photographed within that aperture. If, however, the camera be moved parallel to the aperture and field planes towards scale 16 by a proper distance as shown in Figure 3, its field area will overlap to include scale 16, which will then appear projected within the frame aperture and on the copy as photographed through the aperture.

To facilitate such ready adjustment and placing of the camera, the bracket 18 is provided with a slide member 80, a slot 81, a guiding channel 82, and suitable clamping means 83 for holding the camera either in the ordinary position as in Figure 1 or in the offset overlap position as in Figure 3. Other equivalent offsetting means, such as two spaced screw holes, may be used instead of the slot 81.

The scale 16, when thus photographed by offset placing of the field area, constitutes a record on the copy, showing the reduction ratio used in copying, this ratio being indicated by the highest reading of scale 16 showing on the copy. From this can be determined the original scale of the drawing, map or other matter copied. Also the inverse ratio can be used in projection enlargement to restore the film image to the size and scale of the original, for either viewing or photographic printing.

The maginal area thus overlapped and included may also be used to record photographically other data inserted in this abutment member space, such as a number or label for describing, identifying, classifying, indexing or filing.

Shifting of the field area at one edge necessarily involves a like shifting of its opposite edge. Thus its fixated edge falls outward of the abutment edge 16 and for each copying ratio the opposite edge falls offset in the same direction from the proper graduation of scale 15. To give properly corrected readings on this scale, a series of offset graduation marks 84 are shown in Figure 3. These marks are spaced numerically downward along scale 15 from the regular marks thereof by the distance of shift provided by the slot 81, and should be indicated by shorter or otherwise different marks to distinguish them as comprising an offset scale.

While such shifting of the camera and provision of offset scale marks are shown only lengthwise of the scale 15, similar shift and scale means may also or instead be used transversely thereof along scale 16.

Among the advantages resulting from my invention are the following:

By reason of the two fixated edges of the field area, the original to be copied can be placed instantly and positively in correct position against two fixed guide abutments.

The copying ratio required to cover a given original or field area can be read instantly from the fixed abutment scales as a copying number, permitting instant and positive setting of the camera position and of its focusing.

The correlated altering of frame aperture dimensions, film pull-up, and field area scales preserves such advantages in copying originals of varying proportions.

By a mere shift of the camera to a controlled position, and use of a correspondingly offset abutment scale, the other abutment scale is photographed on the copy, providing a record of the ratio of reduction used, permitting the restoring of the copy to original size and scale by enlarging at that same ratio.

That same camera shift permits inclusion of other marginal data in the copy field.

The effectiveness of my invention in these several ways arises basically from its precise fixation of two adjacent field edges. Thereby the zero of each and every field scale is fixated in either the ordinary or the offset position, so that correct scale readings are possible at all copying ratios. Thereby too the film pull-ups can be made positively, without either overlapping of film frames or excessive margins between them. In these and other ways, my invention, by its basic and precise fixation of the two field edges, therefore makes all its secondary devices and uses practical and effective.

The foregoing description sets forth the invention in its preferred practical form, but the invention is to be understood as fully commensurate with the appended claims.

Having thus fully described my invention, what I claim as new and desire to secure by Letters Patent is:

1. In a copying camera assembly having a lens, a frame member provided with a limiting aperture at one side of said lens, a field locating member at the other side of said lens, means for guiding the frame aperture for focusing movement relative to and axially of said lens, with said lens and field member relatively movable with respect to one another, a straight supporting guide for directing movement of at least one of said lens and field member parallel to a straight line drawn from the principal focal point of the lens on the field side thereof to a corner of the field image of the aperture as projected through the lens when the planes of said aperture and field are in conjugate focus, abutment members on said field locating member extending from said field image corner parallel to adjacent edges of the frame aperture and having scales thereon the zeros of which are at said field image corner and the unit divisions of which equal respectively the parallel dimensions of the frame aperture; the improvement which comprises means for guiding and intermittently controlling movement of the photographic film across said limiting frame aperture in at least one direction by a unit distance substantially equal to the dimension of the frame aperture in that direction.

2. An assembly according to claim 1, having means for altering at least one dimension of the frame aperture, and means for correlatively altering the corresponding unit distance of film movement.

3. In a copying camera assembly having a lens, a frame member provided with a limiting aperture at one side of said lens, a field locating member at the other side of said lens, means for guiding the frame aperture for focusing movement relative to and axially of said lens, with said lens and field member relatively movable with respect to one another, a straight supporting guide for directing movement of at least one of said lens and field member parallel to a straight line drawn from the principal focal point of the lens on the field side thereof to a corner of the field image of the aperture as projected through the lens when the planes of said aperture and field are in conjugate focus, abutment members on said field locating member extending from said field image corner parallel to adjacent edges of the frame aperture and having scales thereon the zeros of which are at said field image corner and the unit divisions of which equal respectively the parallel dimensions of the frame aperture; the improvement which comprises means for shifting position of the camera parallel to the field plane and at right angles to at least one abutment member to shift the field area to include the scale of said abutment member.

4. An assembly according to claim 3, wherein the other abutment member has a supplementary scale the zero of which is at the field corner as thus shifted.

5. In a copying camera assembly having a lens, a frame member provided with a limiting aperture at one side of said lens, a field locating member at the other side of said lens, means for guiding the frame aperture for focusing movement relative to and axially of said lens, with said lens and field member relatively movable with respect to one another, a straight supporting guide for directing movement of at least one of said lens and field member parallel to a straight line drawn from the principal focal point of the lens on the field side thereof to a corner of the field image of the aperture as projected through the lens when the planes of said aperture and field are in conjugate focus, abutment members on said field locating member extending from said field image corner parallel to adjacent edges of the frame aperture and having scales thereon the zeros of which are at said field image corner and the unit divisions of which equal respectively the parallel dimensions of the frame aperture; the improvement which comprises means for altering at least one dimension of the frame aperture, and means for correlatively altering the unit divisions of each abutment member scale to equal each such altered frame aperture dimension.

References Cited in the file of this patent

UNITED STATES PATENTS 2,741,945     Broms _____ Apr. 17, 1956